United States Patent
Watkins

(10) Patent No.: US 11,243,703 B2
(45) Date of Patent: Feb. 8, 2022

(54) EXPANDABLE INDEX WITH PAGES TO STORE OBJECT RECORDS

(71) Applicant: Hewlett Packard Enterprise Development LP, Houston, TX (US)

(72) Inventor: Glenn Watkins, Northborough, MA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 283 days.

(21) Appl. No.: 15/964,933

(22) Filed: Apr. 27, 2018

(65) Prior Publication Data

US 2019/0332303 A1    Oct. 31, 2019

(51) Int. Cl.
*G06F 7/00* (2006.01)
*G06F 3/06* (2006.01)

(52) U.S. Cl.
CPC ............ *G06F 3/0644* (2013.01); *G06F 3/067* (2013.01); *G06F 3/0608* (2013.01); *G06F 3/0641* (2013.01); *G06F 3/0659* (2013.01); *G06F 3/0664* (2013.01)

(58) Field of Classification Search
CPC ...... G06F 3/0644; G06F 3/0608; G06F 3/067; G06F 3/0641; G06F 3/0664; G06F 3/0659; G06F 3/0607; G06F 3/0685; G06F 16/24561; G06F 16/24568; G06F 16/1744; G06F 16/27

See application file for complete search history.

(56) References Cited

U.S. PATENT DOCUMENTS

| 5,396,470 A | 3/1995 | Storn |
| 5,506,983 A | 4/1996 | Atkinson et al. |
| 5,555,389 A | 9/1996 | Satoh et al. |

(Continued)

FOREIGN PATENT DOCUMENTS

| CN | 102542052 A | 7/2012 |
| CN | 104115134 A | 10/2020 |

(Continued)

OTHER PUBLICATIONS

"A Scalable Indexing Technique and Implementation for Big Spatial Data," Jan. 16, 2017, pp. 1-34, Thermopylae Science + Technology.

(Continued)

*Primary Examiner* — Azam M Cheema
(74) *Attorney, Agent, or Firm* — Hewlett Packard Enterprise Patent Department

(57) ABSTRACT

Implementations of the disclosure describe an expandable index including pages that may store object records. The index may be divided into buckets, and each bucket may be associated with pages from a pool of unused pages shared by the buckets. A table or log may be used to maintain a dynamic list of all unused pages. It may also maintain a list of pages currently associated with buckets. As pages are linked to or unlinked from a bucket, the table or log may be updated to reflect that a page has been linked to a bucket or that a page that is no longer linked to a bucket belongs to the pool of unused pages. As additional storage media are added to the system, additional pages may be added to the pool of the expandable index for use by existing buckets without changing the number of buckets of the index.

20 Claims, 8 Drawing Sheets

(56) References Cited

U.S. PATENT DOCUMENTS

| | | | |
|---|---|---|---|
| 6,016,495 | A | 1/2000 | Mckeehan et al. |
| 6,115,705 | A * | 9/2000 | Larson ............... G06F 16/24556 |
| 6,493,826 | B1 | 12/2002 | Schofield et al. |
| 6,625,512 | B1 | 9/2003 | Goodwin |
| 7,103,595 | B2 | 9/2006 | Anastasiadis et al. |
| 7,139,781 | B2 | 11/2006 | Young et al. |
| 7,454,592 | B1 | 11/2008 | Shah et al. |
| 7,747,663 | B2 | 6/2010 | Atkin et al. |
| 7,814,078 | B1 | 10/2010 | Forman et al. |
| 8,028,106 | B2 | 9/2011 | Bondurant et al. |
| 8,140,625 | B2 | 3/2012 | Dubnicki et al. |
| 8,140,786 | B2 | 3/2012 | Bunte et al. |
| 8,239,356 | B2 | 8/2012 | Giampaolo et al. |
| 8,478,799 | B2 | 7/2013 | Beaverson et al. |
| 9,928,178 | B1 | 3/2018 | Solapurkar |
| 10,241,722 | B1 | 3/2019 | Malwankar et al. |
| 2004/0148306 | A1 | 7/2004 | Moulton et al. |
| 2004/0220975 | A1 | 11/2004 | Carpentier et al. |
| 2006/0036898 | A1 | 2/2006 | Doering |
| 2009/0013122 | A1 | 1/2009 | Sepe et al. |
| 2009/0157972 | A1 | 6/2009 | Byers et al. |
| 2010/0332846 | A1 | 12/2010 | Bowden et al. |
| 2011/0145207 | A1 | 6/2011 | Agrawal et al. |
| 2011/0276744 | A1 | 11/2011 | Sengupta et al. |
| 2011/0276781 | A1 | 11/2011 | Sengupta et al. |
| 2011/0307447 | A1* | 12/2011 | Sabaa ............... G06F 16/24556 707/637 |
| 2013/0013874 | A1 | 1/2013 | Graefe et al. |
| 2013/0318051 | A1 | 11/2013 | Kumar et al. |
| 2015/0019792 | A1 | 1/2015 | Swanson et al. |
| 2015/0142733 | A1 | 5/2015 | Shadmon |
| 2015/0379060 | A1 | 12/2015 | Levandoski et al. |
| 2016/0139981 | A1 | 5/2016 | Chennamsei et al. |
| 2016/0378818 | A1 | 12/2016 | Marcotte |
| 2017/0124128 | A1 | 5/2017 | Oks et al. |
| 2017/0139976 | A1 | 5/2017 | Aggarwal et al. |
| 2017/0169069 | A1 | 6/2017 | Manjunath et al. |
| 2017/0177644 | A1 | 6/2017 | Golander et al. |
| 2017/0199891 | A1 | 7/2017 | Aronovich et al. |
| 2018/0218023 | A1 | 8/2018 | Fanghaenel et al. |
| 2018/0322062 | A1 | 11/2018 | Watkins et al. |
| 2019/0325048 | A1 | 10/2019 | Watkins et al. |

FOREIGN PATENT DOCUMENTS

| | | | |
|---|---|---|---|
| JP | 2012-531675 | | 12/2012 |
| WO | 2010/015181 | A1 | 2/2010 |
| WO | 2010/151813 | A1 | 12/2010 |
| WO | 2016/122710 | A1 | 8/2016 |
| WO | WO-2017180144 | A1 | 10/2017 |

OTHER PUBLICATIONS

Jul. 8, 2013 International Search Report and WRitten Opinion in corresponding PCT/US2013/027296.

Kawaguchi et al., "A Flash-Memory Based File System", Proceeding TCON'95 Proceedings of the USENIX 1995 Technical Conference Proceedings, 1995,10 pages.

Levanoni et al., "An On-the-Fly Reference-Counting Garbage Collector for Java", ACM Transactions on Programming Languages and Systems (TOPLAS), vol. 28,2006, 67 pages.

Li, et al., "Secure Untrusted Data Repository (SUNDR)", USENIX Association OSDI '04: 6th Symposium on Operating Systems Design and Implementation, Dec. 6-8, 2004, pp. 121-136, (Springpath Exhibits 1003 & 1103).

MARC Record Information for Operating Systems Review—Proceedings of 18th ACM Symposium on Operating Systems Principles (SOSP'01), Oct. 21-24, 2001, CD-ROM, available at the Auburn University Library online catalog, accessed Jul. 28, 2017,1 page.

MARC Record Information for Operating Systems Review—Proceedings of the Fifth ACM Symposium on Operating Systems Design and Implementation (OSDI'02), available at the WRLC online catalog, accessed Jul. 20, 2017, 3 pages.

MARC Record Information, "THE DESiGN And Implementation of The FreeBSD Operating System" 2005, 2 pages, available at the online catalog of the George Mason University Library, accessed Aug. 3, 2017.

Marice J. Bach, The Design of the UNIX Operating System (1986), 8 pages.

Marshall Kirk McKusick, et al., "The Design and Implementation of the Freebsd Operating System", FreeBSD version 5.2, CSCO-1011, (2005), p. 143.

Martin Placek, "Storage Exchange: A Global Platform for Trading Distributed Storage Services," Master of Engineering Science Thesis, The University of Melbourne, Australia, Jul. 2006,185 pages.

Mckusick et al., "A fast file system for UNIX", ACM Transactions on Computer Systems (TOCS), vol. 2,1984, 14 pages.

Mendel Rosenblum, "The Design and Implementation of a Log Logstructuredfile System", Kluwer Academic Publishers, 1995, 3 pages.

Mesnier et al., "Object-Based Storage", IEEE Communications Magazine, vol. 41, Aug. 2003, pp. 84-90.

Microsoft Computer Dictionary, 5th Ed., 2002, 7 pages.

Nitin Agrawal, et al., "Design Tradeoffs for SSD Performance," USENIX'08:2008 USENIX Annual Technical Conference, Jun. 25, 2008, pp. 57-70.

OBFS: A File System for Object-based Storage Devices, Feng, et al., 2004, SimpliVity Exhibit 2006, *Springpath* v. *SimpliVity* IPR2016-01779, 18 pages.

Object Storage versus Block Storage: Understanding the Technology Differences, Aug. 14, 2014 (available at http://www.druva.com/blog/object-storage-versus-block-storage-understandi- ng-technology-differences/) (last visited Dec. 22, 2016), SimpliVity Exhibit 2004, *Springpath* v. *SimpliVity* IPR2016-01779, 7 pages.

Office Action dated Sep. 17, 2015 in Japanese Patent Application No. 2014-558858 with English translation.

Operating Systems Review—Proceedings of the 18th ACM Symposium on Operating Systems Principles (SOSP'01), vol. 35, No. 5. pp 202-15, Oct. 21-24, 2001, obtained from a CD-ROM from Auburn University, 11 pages.

Patent Examination Report No. 1 dated Jul. 23, 2015 in Australia Patent Application 2013222325 (NOTE: Examination Report incorrectly identifies W02010/15181 instead ofW02010/151813, published Dec. 29, 2010, Applicant Simplivt Corp. Copies of both documents are cited and included.).

Patent Owner's Preliminary Response Pursuant to 37 CFR 42.107(a), Case IPR2017-01933, U.S. Pat. No. 8,478,799, Dec. 21, 2017, p. 147.

Per-Ake Larson and Ajay Kajla, "File Organization: Implementation of a Method Guaranteeing Retrieval in one Access," 8070 Communications of the Association of Computing Machinery, Jul. 1984, 9 pages.

Petition for Inter Partes Review of U.S. Pat. No. 8,478,799 filed Aug. 11, 2017, case IPR2017-01933, 92 pages. The citations from PIR2017-01933 are submitted herewith below.

Petition for Inter Partes Review of U.S. Pat. No. 8478799 before the USPTO Patent Trial and Appeal Board dated Sep. 14, 2016, Case IPR2016-01780, 66 pages.

Petitioner's Reply to Patent Owners Preliminary Response, Case IPR2017-01933, U.S. Pat. No. 8,478,799, Feb. 28, 2018, pp. 1-17.

Pmem.Io, "Nvm Library Overview", Persistent Memory Programming, available online at Khttps://web.archive.Org/web/20140916002916/http://pmem.io:80/2014/09/01/nvm-library-overview.html>, Sep. 1, 2014, 2 pages.

Pmem.Io, "Persistent Memory Development Kit", Persistent Memory Programming, available online at Khttps://web.archive.org/web/20180121183956/http://pmem.io:80/pmdk>, Jan. 21, 2018, 3 pages.

Prashant Shenoy, "Declaration of Prashant Shenoy. PhD, Under 37 C.F.R. sctn. 1.68 in Support of Petition for Inter Paries Review of U.S. Patent No. 8,478, 799", dated Aug. 11, 2017,196 pages.

Prashant Shenoy, et al., "Symphony: An Integrated Multimedia File System," Proceedings of SPIE 3310, Multimedia Computing and Networking 1998, pp. 124-138.

(56) References Cited

OTHER PUBLICATIONS

Preliminary information, AMD Athlon, Processor Module Data Sheet, AMD .Athlon, Publication #21016, Rev. M, Issue Date:, Jun. 2000, 74 pages.
Presentation: "Object Storage technology," Storage Networking Industry Association, 2013 (available at http://www.snia.org/sites/defaull/education/tutorials/2013/spring/file/BrentWelch Object Storage Technology.pdf) (last visited Dec. 22, 2016), SimpliVity Exhibit 2003, *Springpath* v. *SimpliVity* IPR2016-01779, 42 pages.
Prosecution History of the U.S. Pat. No. 8,478,799 patent, 576 pages.
Quinlan et al., "Venti: a new approach to archival storage" Proceedings of Fast, Conference on File and Storage Technologies, Jan. 28, 2002, pp. 1-13, XP002385754.
R. Rivest, "The MD5 Message-Digest Algonthm," Request for Comments 1321, Internet Engineering Task Force, CSCO-1017, Apr. 1992, 21 pages.
Ragib Hasan, et al., "A Survey of Peer-to-Peer Storage Techniques for Distributed File Systems," International Conference on Information Technology: Coding and Computing, 2005, 9 pages.
Response to U.S. final Office Action dated Feb. 22, 2013 filed May 8, 2013 in U.S. Appl. No. 12/823,922 (Springpath Exhibits 1012 & 1112), 48 pages.
Response to U.S. non-final Office Action dated Aug. 30, 2012 filed Dec. 18, 2012 in U.S. Appl. No. 12/823,922 KSpringpath Exhibits 1009 & 1109), 148 pages.
Rhea et al., Fast, "Inexpensive Content-Addressed Storage in Foundation", Proceeding of USENIX 2008 Annual Technical Conference, 2008,14 pages.
Ritchie et al., "The UNIX Time-Sharing System", Communications of the ACM, vol. 17, Jul. 1974, pp. 365-375.
Sandberg et al., "Design and implementation of the Sun network filesystem", USENIX Conference and Exhibition, Portland, 1985, 12 pages.
Sang-Won Lee, et al., "A Case for Flash Memory SSD in Enterprise Database Applications," Proceedings of the 2008 ACM SIGMOD International Conference on Management of Data (2008), pp. 1075-1086.
Shim Hyotaek Ed- Chung Lawrence et al.: "PHash: A memory-efficient, high-performance key-value store for Targe-scale data-intensive applications", Journal of Systems & SOFTWARE, vol. 123, Jan. 2017 (Jan. 2017), —Jan. 2017 (Jan. 2017), pp. 33-44.
SimpliVity Corporation's Markman Hearing Transcript, Case No. 15cv13345-TSH, Aug. 16, 2017, pp. 1-119.
Simplivity Corporation's Opening Claim Construction Brief, Case 4:15-cv-13345-TSH, Document 130, Jul. 10, 2017, pp. 1-21.
Simplivity Corporation's Reply Claim Construction Brief, Case 4:15-cv-13345-TSFI, Document 132, Jul. 24, 2017, pp. 1-23.
SNIA, "NVM Programming Model (NPM)", Version 1, SNIA Technical Position, Dec. 21, 2013, 85 pages.
Springpath Inc.'s Preliminary Invalidity Contentions, C.A. No. 4:15-cv-13345-TSH Document 101, filed Mar. 21, 2017 in the US Disctrict Court for the District of Massachusetts and Exhibit A1.
Stevens, et al., "The first collision for full SHA-1," International Association for Cryptology Research 2017, pp. 570-596.
The EMC Centera and TOWER Technology Advantage, EMC White Paper, Jul. 2002, pp. 1-8.
U.S. Provisional App. Filed on Jun. 26, 2009, 32 pages, U.S. Appl. No. 61/269,633.
Understanding Object Storage and Block Storage use cases, Jul. 20, 2015 (available at http://cloudacademy.com/blog/object-storage-block-storage/) (last visited Dec. 22, 2016), SimpliVity Exhibit 2005, *Springpath* v. *SimpliVity* IPR2016-01779, 9 pages.
US Patent and Trademark Office non-final Office Action dated Aug. 30, 2012 in U.S. Appl. No. 12/823,922 (Springpath Exhibits 1006 & 1106), 32 pages.
US Patent and Trademark Office Notice of Allowance dated May 29, 2013 in U.S. Appl. No. 12/823,922 (Springpalh Exhibits 1013 & 1113), 12 pages.

USENIX Association, "Proceedings of the First Symposium on Networked Systems Design and Implementation," Mar. 2004, pp. 1-15, San Francisco, CA, USA.
USPTO PTAB Decision Denying Institution of Inter Partes Review entered Mar. 21, 2017, *Springpath*, Inc. v. *SimpliVity Corp.*, Case IPR2016-01780, U.S. Pat. No. 8,478,799 B2, 15 pages.
USPTO PTAB Decision Denying Institution of Inter Partes Review entered Mar. 22, 2017, *Springpath, Inc.* v. *SimpliVity Corp.*, Case IPR2016-01779, U.S. Pat. No. 8,478,799 B2, 15 pages.
USPTO PTAB Patent Owner's Preliminary Response dated Dec. 27, 2016, *Springpath, Inc.* v. *SimpliVity Corp.*, Case IPR2016-01779, Patent 8,478,799 B2 (SimpliVity Exhibits 2001-2009 listed below).
USPTO PTAB Patent Owners Preliminary Response dated Dec. 27, 2016, *Springpath, Inc.* v. *SimpliVity Corp.*, Case IPR2016-01780, U.S. Pat. No. 8,478,799 B2 (SimpliVity Exhibits 2001-2009 identical to IPR2016-01779 and previously submitted), 48 pages.
Webopedia: "Inode" (available at http://www.webopedia.com/TERM/l/inode.html) (last visited Dec. 20, 2016), SimpliVity Exhibit 2002, *Springpath* v. *SimpliVity* IPR2016-01779,2 pages.
Webster's New World Computer Dictionary, 10th Ed. 2003, 3 pages.
Wikipedia, "Write-Ahead Logging", retrieved from Khttps://web.archive.org/web/20110130005202/http://en.wikipedia.org:80/wiki/Write-ahead_logging>, Jan. 30, 2011, 1 page.
Wikipedia: "Namespace" (available at https://en.wikipedia.org/wiki/Namespace) (last visited Dec. 6, 2016), SimpliVity Exhibit 2008, *Springpath* v. *SimpliVity* IPR2016-01779, 3 pages.
Wikipedia: "Object Storage" (available at https://en.wikipedia.org/wiki/Object.sub.--storage) (last visited Dec. 6, 2016), SimpliVity Exhibit 2001, *Springpath* v. *SimpliVity* IPR2016-01779, 9 pages.
Xie, et al., "Oasis: An active storage framework for object storage platform", Future Generation Computer Systems, vol. 56, Mar. 2016,14 pages, SimpliVity Exhibit 2007, *Springpath* v. *SimpliVity* IPR2016-01779.
You et al., "Deep Store: An Archival Storage System Architecture", 21st International Conference on Data Engineering (ICDE'05), 2005,12 pages.
Youyou Lu et al., "LightTx: A Lightweight Transactional Design in Flash-based SSDs to Support Flexible Transactions", IEEE 31st International Conference on Computer Design (ICCD), 2013, pp. 1-8. IEEE. http://www.pdi.cmu.edu/PDL-FTP/NVM/lighttx-ssd_iccd13.pdf.
Zhu et al., "Avoiding the Disk Bottleneck in the Data Domain Deduplication File System", Proceeding FAST'08 Proceedings of the 6th USENIX Conference on File and Storage Technologies, Article No. 18, 2008,14 pages.
"AMD Athlon Processor", ADM Technical Brief, Publication # 22054, Rev. D, Issue date Dec. 1999,10 pages.
"Bibliographic Record Information for Operating Systems Review" —Proceedings of the Fifth ACM Symposium on Operating Systems Design and Implementation (OSDI'02), Dec. 9-11, 2002, available at the WRLC online catalog, accessed Jul. 20, 2017,2 pages.
"Bibliographic Record Information for Operating Systems Review"— Proceedings of the 18th ACM Symposium on Operating Systems Principles (SOSP'01) Cd-Rom, Oct. 21-24, 2001. available at the Auburn University Library online catalog, accessed Jul. 28, 2017, 1 pages.
"Curriculum Vitae of Dr. Prashant Shenoy", 2017, 31 pages.
Abd-el-Malek et al., Ursa Minor: Versatile Cluster-Based Storage, Proceeding FAST'05 Proceedings of the 4th conference on USENIX Conference on File and Storage Technologies, vol. 4, 2005,14 pages.
AIX 5L Version 5.2 System Management Concepts: Operating System and Devices, May 2004, 7th ed., IBM, pp. 1-190.
Alan Freedman, "Computer Desktop Encyclopedia", 9th Ed., Osbome/McGraw-Hill, 2001, 7 pages.
AMD Athlon (Trademark), "Processor Quick Reference FAQ", Feb. 3, 2000,12 pages.
Andrew S. Tanenbaum, "Modern Operating Systems", 2d Ed., 2001, 7 pages.
Athicha Muthitacharoen, et al., "Ivy: A Read/Write Peer-to-Peer File System" Proceedings of the 5th Symposium on Operating Systems Desing and Implementation (OSDI '02), Operating Systems Review, vol. 36, Issue SI KWinter 2002), 21 pages.

(56) References Cited

OTHER PUBLICATIONS

Best, et al., "How the Journaled File System handles the on-disk layout", May 2000, IBM: developerWorks: Linux Tibrary/Open souice library Internet download Apr. 18, 2001 http://swgiwas001.sby.IBM.com/developerworks/library/jfslayoul/lndex1.html (Springpath Exhibits 1011 & 1111), 30 pages.
Bibliographic Record Information for Operating Systems Review—Proceedings of the 18th ACM Symposium on Operating Systems Principles (SOSP'01), 2001, available at the online catalog of the Library of Congress, accessed Jul. 31, 2017, 3 pages.
Bibliographic Record Information, "The Design and Implementation of the FreeBSD Operating System", 2005, available at the online catalog of the Library of Congress, accessed Aug. 3, 2017, 2 pages.
Bobbarjung et al., "Improving Duplicate Elimination in Storage Systems", ACM Transactions on Storage, vol. 2, 2006, 23 pages.
Boehm et al., "Garbage Collection in an Uncooperative Environment", Software—Practice & Experience, vol. 18, Sep. 1988,17 pages.
Bruce Eckel, "C++ Inside & OUT", 1992, 6 pages.
Bruce Schneier, "Applied Cryptography, 2d Ed, Protocol, Algorithms, and Source Code in C", John Wiley & Sons, Inc., 1996,4 pages.
Byung-Gon Chun, et al., "Efficient Replica Maintenance for Distributed Storage Systems," USENIX Association, Proceedings of Nsdi '06: 3RD Symposium On Networked Systems Design & IMPLEMENTATION, 2006, pp. 45-58.
Chacon, S., "Pro Git," Berkeley, CA: Apress; New York 2009.
Chaves et al., "Cost-Efficient SHA Hardware Accelerators", IEEE Transactions on Very Large Scale Integration KVLSI) Systems, vol. 16, No. 8, Aug. 2008, pp. 999-1008.
Cox et al., "Pastiche: Making Backup Cheap and Easy", ACM SIGOPS Operating Systems Review—OSDI '02 Proceedings of the 5th Symposium on Operating Systems Design and Implementation, vol. 36, 2002, 14 pages.
Dabek, F, et al., "Wide-area cooperative storage with CFS," Operating Systems Review- Proceedings of the 18th ACM Symposium on Operating Systems Principles (SOSP'01 ), vol. 35, No. 5,2001, pp. 202-215.
David Bader, "Declaration of David Bader, Under 37 C.F.R. .sctn. 1.68", dated Aug. 10, 2017, 31 pages.
Debnath et al., "ChunkStash: Speeding up Inline Storage Deduplication using Flash Memory" 2010 USENIX Annual Technical Conference (ATC), 2010,16 pages.
Decision Denying Institution of Inter Partes Review, Case IPR2017-01933, U.S. Pat. No. 8,478,799 B2,2018-03-16, pp. 1-18, USPTO.
Declaration of Darrell D.E.Long, Ph.D. Regarding U.S. Pat. No. 8478799 dated Sep. 14, 2016, Case IPR2016-01779 (Springpath Exhibit 1002), 109 pages.
Defendant Springpath, Inc.'s Motion for Leave to File Supplemental Claim Construction Brief, Case 4:15-cv-3345-TSH, Document 146, 2017-10-17, pp. 1-5.
Defendant Springpath, Inc.'s Preliminary Claim Construction Brief with Exhibits, Case 4:15-cv-13345-TSH, Document 129, Jul. 10, 2017, pp. 1-138.
Defendant Springpath, Inc.'s Repiy Claim Construction Brief, Case 4:15-cv-13345-TSH, Document 133, Jul. 24, 2017, pp. 1-17.
English translation of First Office Action dated Feb. 8, 2017 in Chinese Patent Appln. No. 201380017261.8.
European Search Report and Search Opinion Received for EP Application No. 18171116.9, dated Oct. 9, 2018, 8 pages.
Examiner's Requisition dated Oct. 23, 2015 in Canadian Patent Application No. 2,865,240.
Frank Dabek, "A Distributed Hash Table," Sep. 2005, pp. 1-135, Massachusetts Institute of Technology.
Frequently Asked Questions for FreeBSD 2.X, 3.X and 4.X-, unknown date, 8 pages,., Achived at https://web.archive.Org/web/20020404064240/http://www.freebsd.org:80/doc/en_US.IS08859-1/books/faq/install.hLnil.
Fu et al., "Fast and Secure Distributed Read-Only File System", Proceeding OSDI'OO Proceedings of the 4th conference on Symposium on Operating System Design & Implementation, vol. 4, 2000,16 pages.
Garth Gibson, et al., "A Cost-Effective, High-Bandwidth Storage Architecture," Proceedings of the 8th Conference on Architectural Support for Programming Languages and Operating Systems, 1998, pp. 92-103.
Google Search (Year: 2013).
Grant, R., "filesystem Interface for the Git Version Control system," Apr. 24, 2009,14, Retrieved from the Internet http://www.seas.upenn.edu/~cse400/CSE400_2008_2009/websites/grant/final.pdf.
Grembowski et al., "Comparative Analysis of the Hardware Implementations of Hash Functions SHA-1 and SHA-512", Information Security. ISC 2002, Lecture Notes in Computer Science, vol. 2433,2002,15 pages.
Harel Paz, "Efficient Memory Management for Servers", Research Thesis Submitted to the Senate of the Technion- Israel Institute of Technology, Aug. 2006,228 pages.
Haris Volos et al., "Mnemosyne: Lightweiht Persistent Memory", ASPLOS '11, Mar. 5-11, 2011, pp. 1-13, ACM, Newport Beach, California, USA. https://pdfs.semanticscholar.org/b330/1d90e1c7e1dc4e0fdac9352df109cbfdc2ce .pdf.
Hewlett Packard Enterprise Company's Response to Springpath's Supplemental Claim Construction Brief, C.A. No. 4:15-cv-l 3345-TSH, 2017-10-30, pp. 1-5.
Hitz et al., "File System Design for an NFS File Server Appliance", Technical Report 3002, USENIX Winter 1994 -San Francisco, California, Jan. 19, 1994,23 pages.
Hutchinson et al., "Logical vs. Physical File System Backup", Proceedings of the 3rd Symposium on Operating Systems Design and Implementation, New Orleans, Louisiana, Feb. 1999,12 pages.
Ibm, Aix 5L Version 5.2, "General Programming Concepts: Writing and Debugging Programs", 9th Edition, Aug. 2004, 616 pages.
IEEE The Open Group, "1003.1 (Trademark) Standard for Information Technology—Portable Operating System Interface (POSIX (R))", Base Specification, Issue 6, IEEE Std 1003.Jan. 2001, Approved Sep. 12, 2001, The Open Group, (Springpath Exhibits 1015 & 1115), 8 pages.
Ingrid Hsieh-Yee, "Declaration of Ingrid Hsieh-Yee, PhD, Under 37 C.F.R. sctn. 1 .68 in Support of Petition for Inter Partes Review of U.S. Pat. No. 8,478,799", dated Aug. 10, 2017, 77 pages.
International Preliminary Report on Patenlability dated Jun. 16, 2014 in corresponding International Appln. No. PCT/US2013/027296.
Joint Claim Construction and Prehearing Statement, Case 4:15-cv-13345-TSH, Document 136, Aug. 7, 2017, pp. 1-8.
Josh Cates, "Robust and Efficient Data Management for a Distributed Hash Table", Jun. 2003, 64 pages.

\* cited by examiner

EXPANDABLE INDEX WITH PAGES TO STORE OBJECT RECORDS

DESCRIPTION OF THE RELATED ART

Computer systems and clusters of computer systems utilized by enterprises may employ hardware virtualization. Hardware virtualization generally refers to the creation and use of virtual machines (VM) and the like that emulate computer systems with operating systems. Common advantages of hardware virtualization include greater overall hardware-resource utilization, improved system scalability, and simplifying/centralizing administrative management of the system. Data centers are one type of system that can use virtualization to realize these advantages. Some data center systems virtualize storage, computing, and networking resources. Such systems are sometimes referred to as hyper-converged systems. In such systems, a cluster of nodes or servers may share resources among various VMs running on the nodes.

Some implementations of such systems provide for the virtualization of storage allocation and placement for inline deduplication. This may use an index table that tracks every piece of data written to the system. One implementation of index tables in such systems is a fixed sized hash index table that is divided into a plurality of buckets. The hash index table uses a hash function to map data objects of a particular size into object records to a corresponding bucket within the hash table. For example, each of the buckets of the hash index table may be configured to accept an object record corresponding to a hash value within a particular range.

FIG. 1 illustrates an example structure and update mechanism of a bucket 100 in one current implementation of such a hash index table. As illustrated, each bucket is divided into a fixed numbered of pages (pages 101-105 in this example), each page holding a set of object records on a storage. In this example, pages 101-104 of each bucket are used to store the object records which make up the hash table.

In addition, each bucket 100 maintains an unused page 105 (denoted as "0xF") as a failure protection during updating of object records on pages. For example, as new groups of object records are created, they may be placed in a temporary cache before being persisted in a non-volatile storage (e.g., a solid state drive) by placing them on page. If the object records were to overwrite records in an existing page location when they are being persisted to the non-volatile storage, this would present the danger of losing or corrupting data if a failure occurs during the transfer. For example, if there were a power failure when only half of the object records were being transferred to the page, there would be no way of knowing which of the object records written to a current page were updated and which were not updated.

To this end, as groups of object records are persisted to the non-volatile storage to update an existing page, they are instead written to an unused page 105. Once this process is completed, a page map (e.g., remapping table) associated with the bucket 100 is updated such that the location of the previously unused page 105 now becomes the location of the updated page and the previous location of the page that was updated becomes the location of the unused page 105. For instance, as illustrated in the example of FIG. 1, when object records are updated in page 101, the updated object records are written to page 105, and the page map is rewritten to make the former location of page 101 the new location of page 105, and the former location of page 105 the new location of page 101. Similarly, when object records are updated in page 103, the updated object records are written to the new location of page 105, and the page map is rewritten to make the former location of page 103 the former location of page 105, and the former location of page 105 the new location of page 103.

BRIEF SUMMARY OF THE DISCLOSURE

Implementations of the disclosure describe an expandable object index including pages that may store object records.

In one embodiment, a non-transitory computer-readable medium may store executable instructions that, when executed by a processor, cause the processor to perform operations of: maintaining an index including a plurality of pages to store a plurality of object records, where the index is divided into a plurality of buckets, where each of the plurality of buckets is associated with one or more of the plurality of pages; maintaining a log correlating a page on which stored object records are written to a location on a physical storage device; and maintaining a listing of a pool of unused pages from the plurality of pages to which the plurality of object records may be written, where the pool of unused pages is shared across all of the buckets.

In implementations, the instructions when executed by the processor, cause the processor to further perform an operation of: upon writing one or more of the plurality of object records to an unused page of the pool of unused pages, updating the log to reflect the writing of the one or more of the plurality of object records to the unused page and a corresponding location on the physical storage device.

In implementations, the log further includes a listing of pages currently associated with each of the buckets.

In implementations, the instructions, when executed by the processor, further cause the processor to perform operations of: selecting one of the unused pages from the pool of unused pages to write an object record; linking the selected page to a bucket of the plurality of buckets by updating the log to associate the page with the bucket; and writing the object record to the selected page.

In implementations, the instructions, when executed by the processor, further cause the processor to perform operations of: unlinking a second page from the bucket, where the selected page is used to update the second page; and adding the second page to the pool of unused pages.

In implementations, the index is a hash index, and each of the buckets is configured to store object records having a hash signature within a corresponding range of hash signatures, where the hash signature identifies a data object associated with the object record.

In implementations, the index is maintained by a virtual machine. The virtual machine may run on a host in a cluster of hosts, and each each of the hosts may include one or more physical storage devices storing data objects corresponding to the plurality of object records.

In implementations, the instructions when executed by the processor, further cause the processor to perform operations of: determining a number of object records to be written to an unused page from the pool of unused pages; comparing the number of object records to be written to the unused page to a threshold; and if the number of object records to be written to the available page exceeds the threshold, writing the one or more object records to the unused page.

In implementations, the instructions, when executed by the processor, further cause the processor to perform operations of: receiving a data object to be stored in a storage drive; hashing the data object to generate a signature; determining if an object record stored in the index contains the signature; if an object record stored in the index contains the signature, performing inline deduplication of the data object; and if no object record stored in the index contains the signature, adding a new object record including the signature to an unused page from the pool of unused pages.

In implementations, the instructions, when executed by the processor, further cause the processor to perform operations of: starting up a host that stores the index in a nonvolatile storage; after starting up the host, scanning the log to detect pages that are presently unused by the plurality of buckets; and after scanning the log, creating the listing of the pool of unused pages.

In implementations, the index may be stored in a nonvolatile storage.

In one embodiment, a method includes: maintaining an index including a plurality of pages to store a plurality of object records, where the index is divided into a plurality of buckets, where each of the plurality of buckets is associated with one or more of the plurality of pages; maintaining a data structure correlating a page on which stored object records are written to a location on a physical storage device; and maintaining a listing of a pool of unused pages from the plurality of pages to which the plurality of object records may be written, where the pool of unused pages is shared across all of the buckets.

In one embodiment, a non-transitory computer-readable medium may store executable instructions that, when executed by a processor, cause the processor to perform operations of: determining an existence of additional storage media added to one or more of existing storage media; determining storage capacity of the additional storage media; calculating a number of pages to contain in a partition of the additional storage media based on at least a storage capacity of the storage media, an object size of object records, and a number of object records that are stored on each of the pages; creating the partition of the additional storage media, the additional partition containing the pages; and adding the pages to a pool of unused pages to which object records may be written, where the pool is shared by divisions of a storage index including object records stored on the one or more existing storage media and the additional storage media. The storage index may be divided into a plurality of buckets, each of the plurality of the buckets associated with one or more of a plurality of pages configured to store one or more of a plurality of object records.

In implementations, the number of the plurality of the buckets may not change when adding the additional storage media. Additionally, the bucket and page locations of existing object records may not change when adding the additional storage media.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

The figures are not intended to be exhaustive or to limit various embodiments to the precise form disclosed. It should be understood that various embodiments can be practiced with modification and alteration.

DETAILED DESCRIPTION

As used herein, the term "bucket" generally refers to a division of a storage index. Each bucket may be with associated with a particular range of hashes that may be used to determine in what bucket object records are stored (e.g., based on a hash signature of the object record). A bucket may contain a linked or associated list of page(s) that belong to the bucket.

As used herein to refer to a storage index, the term "page" generally refers to a data container that may store one or more object records that are persisted to a storage drive. A page may be implemented as part of a linked list of pages, an array of pages, or some other data structure.

As noted above, some current implementations of virtualized data centers utilize a fixed-size hash index table that is divided into a number of buckets having a fixed number of pages. A failover mechanism used in such implementations is that each bucket always has an unused page that is used to write page updates. Such indexing systems may have a number of disadvantages.

First, as each bucket is required to always have an unused page, this creates a considerable unused page overhead in the index. These unused pages may significantly increase the total time it takes to load the index, and they may substantially reduce the total available memory space for object records.

Second, when the size of the index needs to be increased (e.g., when additional storage media are added to the system), this fixed bucket size design requires the addition of new buckets, which necessarily requires redistributing the object records across the buckets and pages of the newly sized index.

Implementations of the technology described herein are directed to addressing these and other problems that arise with indices used in data storage systems, including systems that provide virtualized storage allocation and deduplication. In particular, implementations described herein are directed to an expandable object index that utilizes a global page remapping table or log shared across all index buckets. In accordance with implementations described herein, the global page remapping table may maintain a dynamic list of all unused pages as well as all current pages associated with buckets (e.g., which bucket a used page currently belongs to). By virtue of this configuration, pages may be allocated as needed to any bucket. As such, each bucket no longer has a fixed number of preallocated pages. Additionally, bucket sizes of an index may be expanded as needed (e.g., if additional storage is added to the system) without having to redistribute all object records across the expanded index.

Figure 1:
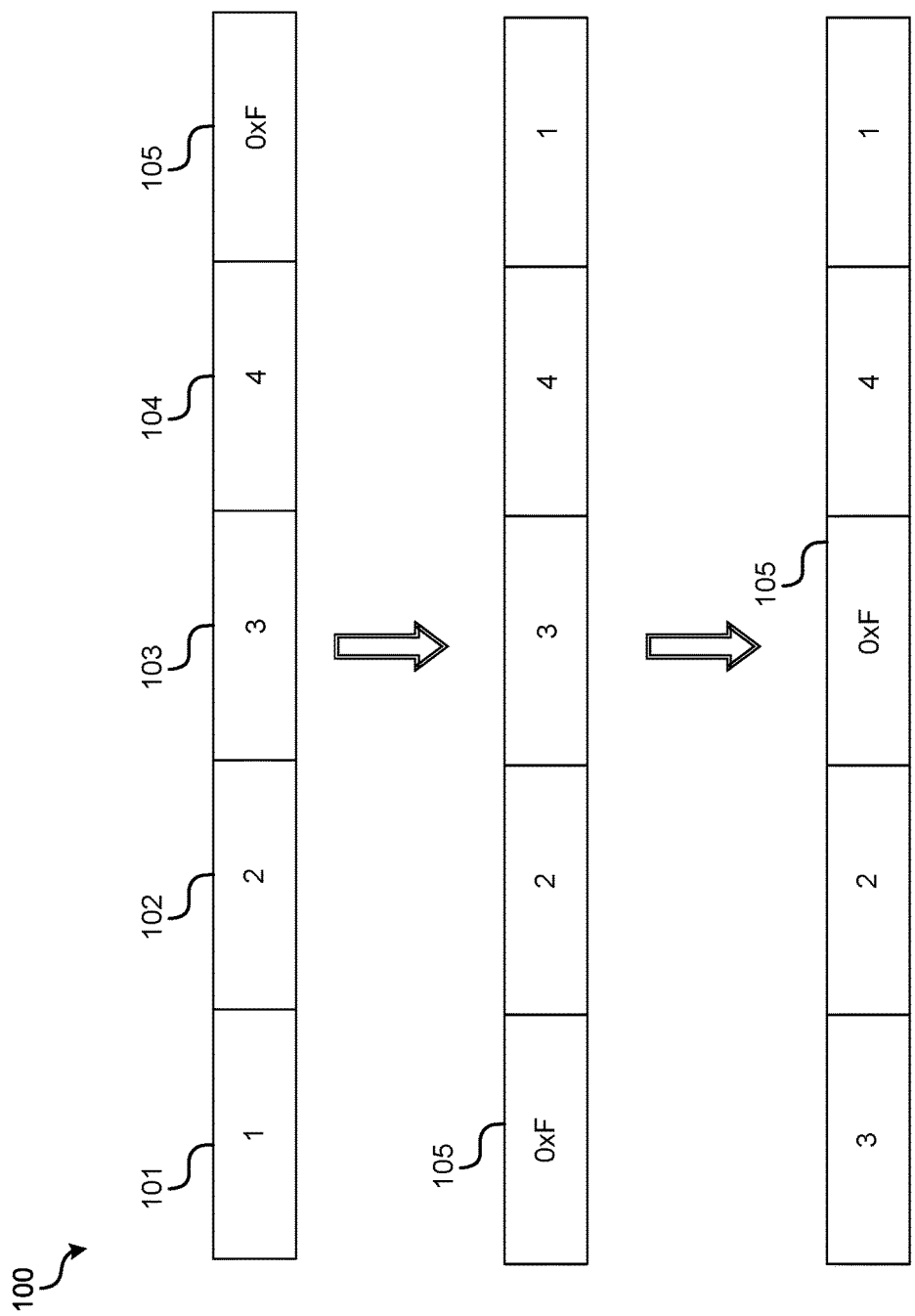
FIG. 1 is a schematic illustrating a current method of page remapping in an index bucket.
Figure 2:
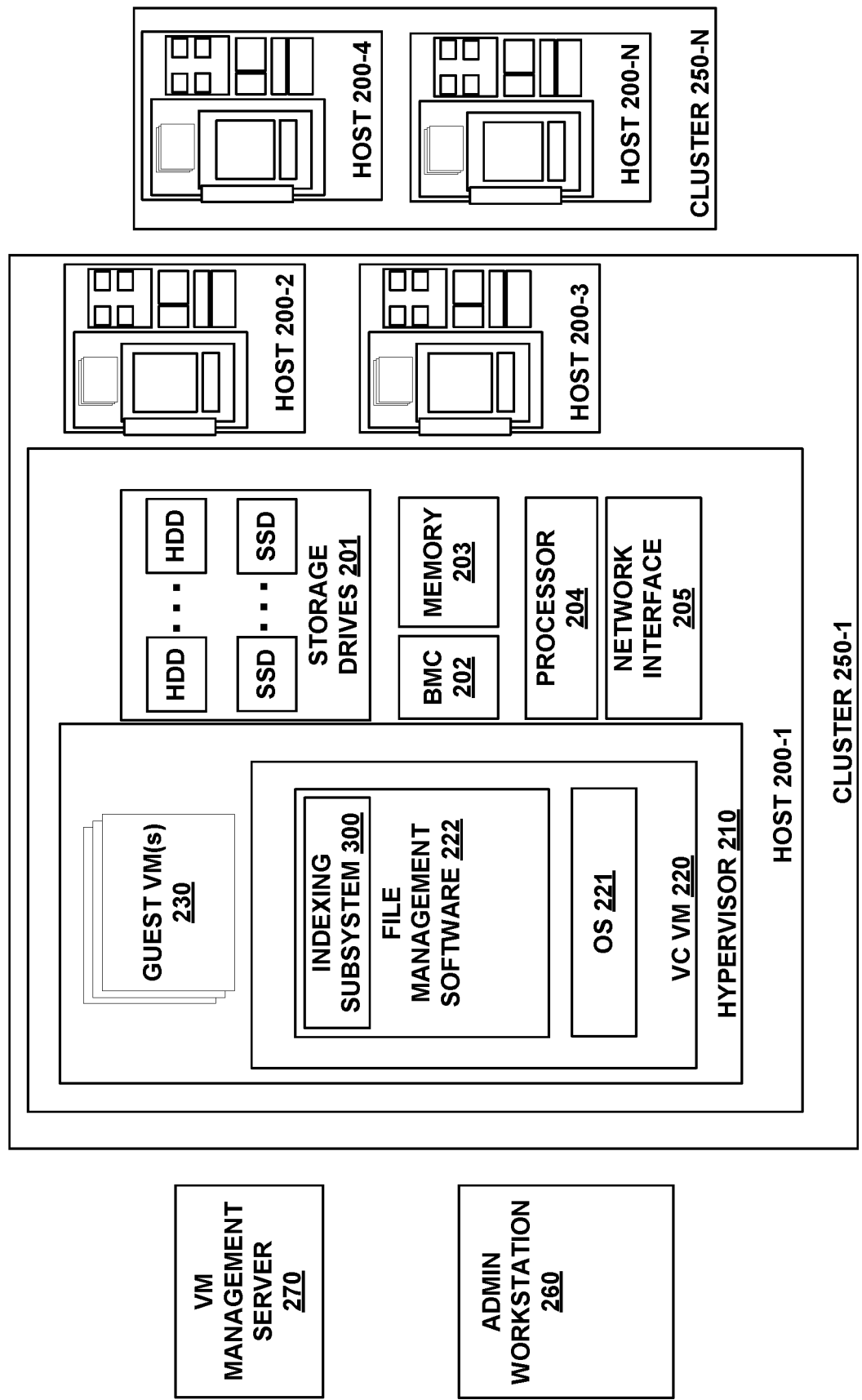
FIG. 2 is a block diagram illustrating an example system in which the technology described herein may be implemented.

Before describing implementations of the expandable object index described herein, it is instructive to describe an example data virtualization system in which it may be implemented. FIG. 2 is a schematic block diagram illustrating one such example. The expandable system includes a plurality of host machines or hosts 200-1 to 200-N (referred to as "hosts 200") grouped into clusters 250-1 and 250-2 (referred to as "clusters 250") that share host resources (e.g., computing and memory resources) that may be allocated to running VMs.

Each host 200 may be implemented as a physical server (e.g., a server having an x86 or x64 architecture) or other suitable computing device. Each host 200 can provide computing and memory resources that may be allocated to VMs 220, 230 and/or shared with other hosts 200 in cluster 250. For example, a cluster 250 may include two hosts 200 that are implemented as x86 servers having 64 GB of memory and two CPUs running at 10 GHz. Cluster 250 may have an aggregate of 128 GB of memory and 20 GHz of computing power that may be allocated to running VMs 220, 230 on hosts 200 therein. During operation of a cluster 250, the resources allocated to VMs 220, 230 running on one or more hosts 200 in the cluster 250 may be dynamically adjusted depending on the needs of the hosts. In implementations, resource pools may be partitioned and assigned to one or more VMs 220, 230 within the hosts in any suitable manner (e.g., based on an enterprise's departmental needs).

The data virtualization system of FIG. 2 may be implemented as a hyperconverged data center that provides functions such as data management, data deduplication, data compression, data optimization, data backup, data restore, data cloning, etc. For instance, VM data may be written simultaneously to two hosts 200 within cluster 250 to provide a failover mechanism for restarting VMs of a failed host and/or providing a VM data backup. As another example, VM data may be moved from one host to another host.

Although the data virtualization system of FIG. 2 embodies a multi-cluster system, in other implementations, the technology described herein may be implemented in systems having a single cluster of hosts. Additionally, although each cluster 250 in this example is illustrated as having multiple hosts 200, in other implementations, the technology described herein may be implemented in clusters 250 having single hosts 200. In some implementations, the technology described herein may be implemented in individual hosts 200 that are not part of a (shared resource) cluster.

Each host 200 may include a hypervisor 210 and hardware components such as storage drives 201 (e.g., a RAID storage having a number of hard disk drives (HDD) and/or solid state drives (SSD)), baseboard management controller (BMC) 202, memory 203 (e.g., RAM, ROM, flash, etc.), one or more processors 204, and a network interface 205 to communicate over a network (e.g., with other hosts or with the Internet over a TCP/IP network). Object record data written to host 200 may first be stored in a memory 203. This stored data may be divided into a subset of data, referred to as "dirty records." When the number of dirty records exceeds a threshold, the dirty records may be persisted to storage drives 201. In some implementations, an expandable hash index is stored in memory 203.

Hypervisor 210 may be configured to create and/or run one or more guest VMs 230 and virtual controller VM 220 (referred to herein as "VC VM" or "VC"). It may be implemented as software, firmware, and/or hardware. In particular implementations, hypervisor 210 may be implemented as VMWARE ESX/ESXi, XEN, HYPER-V, or some other suitable hypervisor for creating and running VMs.

In the example system of FIG. 2, a VM management server 270 may provide a centralized management application to connect to and manage hosts 200 (e.g., provision resources), including hosted VMs 230, and for performing other related functions. The centralized management application may provide a graphical user interface (GUI) that allows a user to manage individual nodes, clusters of nodes, or all nodes. In particular implementations, VM management server 270 may be implemented with vCenter® or SCVMM.® In the system illustrated by FIG. 2, admin workstation 260 may access VM management server 270 to connect to and manage hosts 200. In other implementations (e.g., in implementations having only a few VMs/single hosts), an admin workstation 260 may directly connect to and manage host(s) and VM(s) without a VM management server.

In this example system, VC 220 is a VM configured to run file management software 222 (e.g., by a hardware processor executing machine readable instructions stored on a non-transitory computer readable medium) that may be used to perform a variety of processes relating to file management on one host or a plurality of hosts on a cluster. For example, file management software 220 may be configured to perform processes such as deduplicating data, managing an expandable storage index, managing access by VMs 130 to storage drives 101, providing dynamic resource sharing, moving VM data between storage drives 101, etc. These functions may be performed with respect to VMs 230 currently running on the host 200 and/or all VMs 230 running on hosts belonging to the same cluster 250. In particular implementations, VC 220 may be implemented using HPE OmniStack.®

By way of example, data deduplication may be performed by file management software 222 as follows. As data is stored on storage drives 201, the data may be divided into a plurality of subsets of data (e.g., data objects) and hashed to create object records that may be stored in a RAM (e.g., memory 203) as "dirty" object records. Each of the plurality of dirty object records which are stored in memory 203 may be persisted to a storage drive 201 on a page associated with an index, further described below. While this process is performed, file management software 222 may also run a deduplication process to determine that the plurality of subsets of data have not already been saved to storage drives 201. This may be accomplished by determining if a bucket of the index holds an object record containing the same signature as a signature generated from hashing a data subset. If the object record is not already contained, it may be added to a page and inline deduplication of the associated data object may not be performed. If the object record is already present in a bucket, inline deduplication of the associated data object may be performed. Additionally, the existing object record may be updated. For example, a reference count of the object record that tracks the number of times an associated data object has been used may be incremented.

Figure 3:
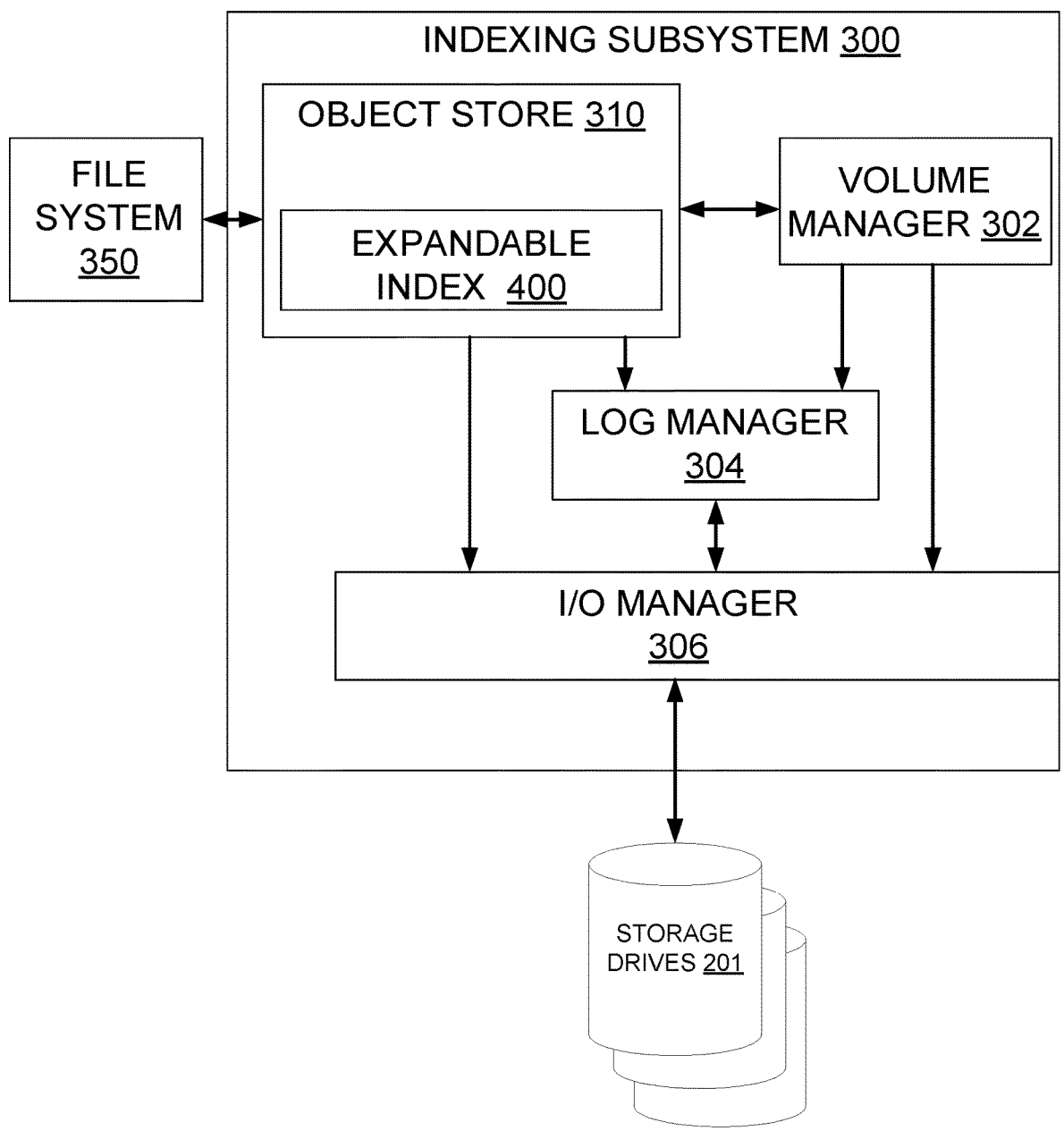
FIG. 3 is a block diagram illustrating one example implementation of an indexing subsystem.

In this example, file management software 222 comprises an indexing subsystem 300 that may be used to manage an expandable global index, perform data deduplication, and/or perform other related functions. FIG. 3 is a block diagram illustrating one example implementation of an indexing subsystem 300. As illustrated, indexing subsystem 300 may communicatively couple to a file system 350 from which it receives object data. Indexing subsystem 300 may include an object store 310 having an expandable index 400, a volume manager 302, a log manager 304 and input/output (I/O) manager 306.

During operation, object store 310 may be configured to manage data objects, data object deduplication, and the mapping of object signatures (e.g., hashes) to storage addresses in storage drives 201. For example, when file system 350 asks to retrieve an object from a storage drive 201 based on a signature of the object, object store 310 may use expandable index 400 to translate that signature to a storage address in a storage drive 201, and request the object from a volume manager 302 using the storage address. Object store 310 may also receive object record data (e.g., dirty records) to be persisted to a non-volatile storage drive 201 from a memory (e.g., a DRAM). For example, a component of file management software 222 may manage the operation of creating a plurality of object records by hashing one or more data objects.

Each object record may include an object signature (e.g., hash of object) and a storage address associated with the object. In some implementations, each object record may also include a reference count that tracks the number of times a data object associated with an object record has been accessed. In some implementations, the size of all object records may be the same (e.g., each object record may have a signature that is the same size for all records).

Expandable index 400 may be configured to map object records of data objects and/or metadata objects (e.g., object records created by hashing the respective object) to storage addresses on storage drives 201. The expandable index 400 may comprise a plurality of pages configured to store one or more of the plurality of object records. The index may be divided into a plurality of buckets, which as further described below, may be dynamically associated with one or more of the plurality of pages. Stated differently, the number of pages associated with each bucket is not fixed and may be dynamically adjusted. During indexing of an object record, an object record may be assigned to a particular one of the buckets depending on the hash of the record.

Volume manager 302 may determine a storage allocation of one or more storage drives 201. For example, before a new object record is written to a storage drive 201, volume manager 302 may reserve a virtual block address (VBA), that represents an entry in a log managed by log manager 304.

Log manager 304 may be used by both object store 310 and volume manager 302 to persist data structure updates, including managing the persistence of page mapping of index pages that contain object records. It may manage a global log or mapping table that may keep track of a pool of unused pages of the index 400. The pool of unused pages of the index may be associated with any of the buckets of the index 400. The pool of unused pages, in some implementations, may include unused pages partitioned from additional storage media added to storage drives 201.

The global log used to track unused pages may also be used to track current associations between pages and buckets. Alternatively, a separate log may be used to track current associations between pages and buckets. By virtue of using a global page remapping log or table that may be shared across all index buckets, bucket sizes may be dynamically adjusted by adding or removing page associations.

I/O manager 306 may be used to manage input/output communications between indexing subsystem 300 and storage drives 201.

Figure 4:
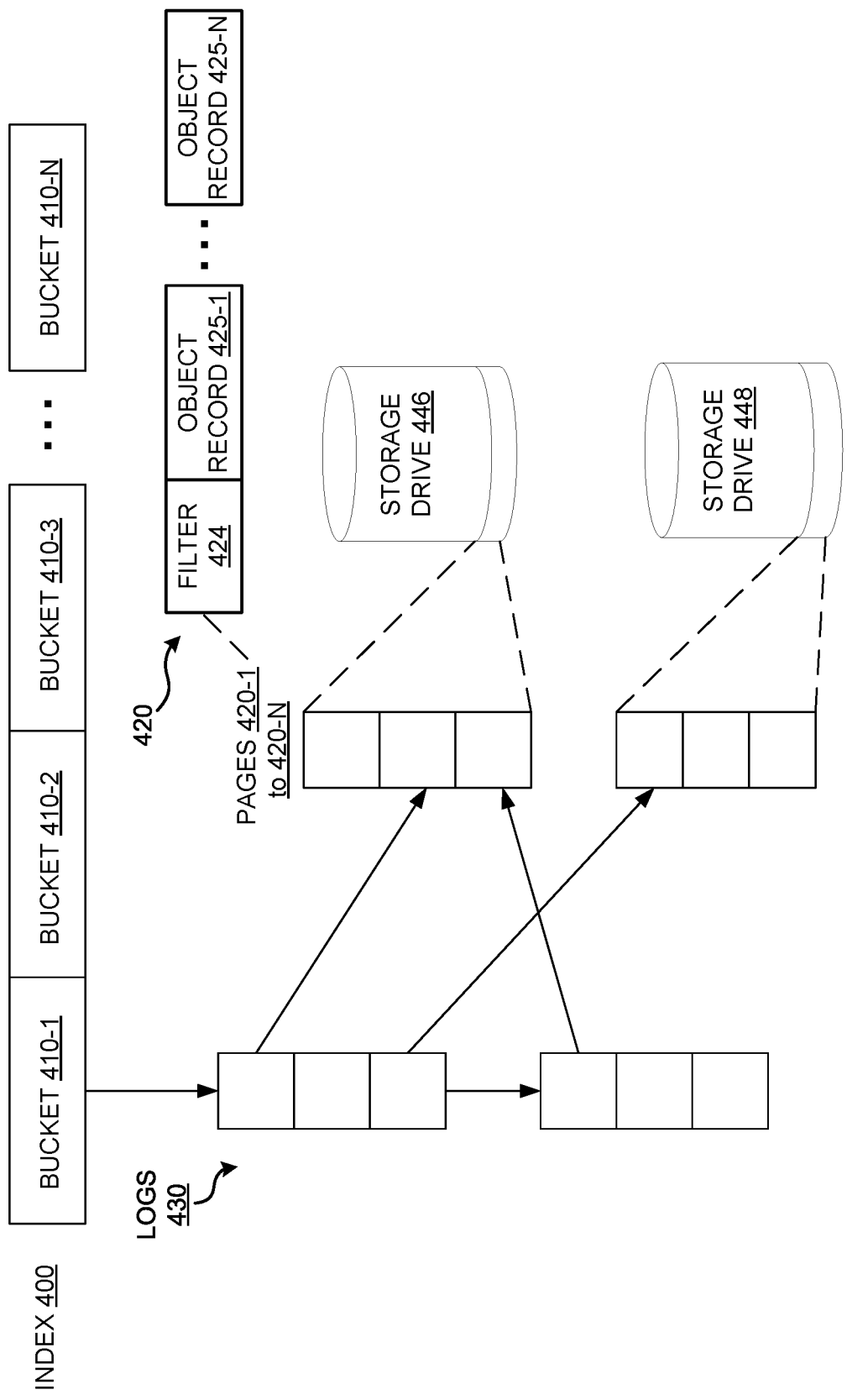
FIG. 4 is a diagram illustrating an example of a global page remapping index according to some implementations

FIG. 4 is a diagram illustrating an example implementation of an expandable index 400. As illustrated, index 400 is divided into a plurality of buckets 410-1 to 410-N (individually referred to as a bucket 410), each of which may be dynamically associated with or linked to one or more pages 420-1 to 420-N (individually referred to as a page 420) that store object records. For example, bucket 410-1 and bucket 410-2 may be linked to a different number of pages.

In this example, one or more logs 430 may maintain the associations between buckets 410-1 to 410-N and pages 420-1 to 420-N. For example, for a log entry corresponding to a bucket 410, the entry may contain page identifiers identifying pages that the bucket 410 points to or is otherwise linked to. For each page 420, the entry may also correlate a storage address on a storage drive 446 or 448 to the page 420. For example, it may contain a mapping of a page identifier to a storage logical block address (LBA). In some implementations, one log is associated with each storage drive.

In addition, the one or more logs 430 may be used to maintain a pool of unused pages of the index 400. The pool of unused pages of the index may be associated with any of the buckets of the index 400 as needed (e.g., as new object records are created and written to pages or as objected records are updated). In some implementations, the one or more logs 430 may be used to generate a list or global mapping table of the pool of unused pages.

Each page 420 may store object record(s) 425-1 to 425-N (individually referred to as object records 425) and include a filter 414. The filter may be used during a deduplication or search function to determine which page a particular record is located at. An object record 425 may include an object signature (e.g., hash), a reference count and a storage address. The reference count may keep count of the number of times the respective object record has been accessed for file management. For example, if the reference count falls below an access threshold, the object record may be deleted from the index.

Figure 5:
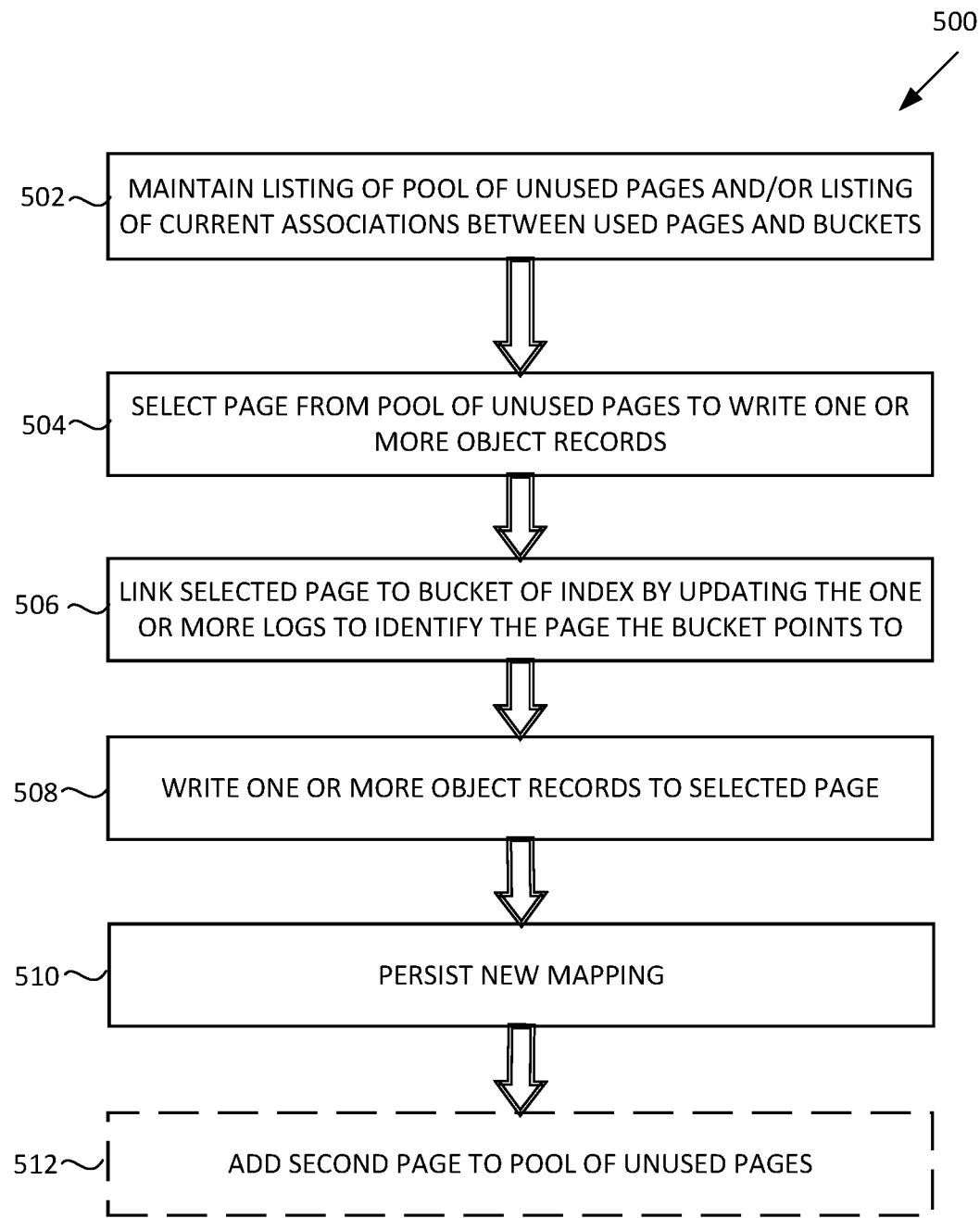
FIG. 5 is an operational flow diagram illustrating an example method of persisting object records to a page of an index that utilizes a global page remapping log, in accordance with some implementations.

FIG. 5 is an operational flow diagram illustrating an example method 500 of persisting object records to a page of an index that utilizes a global page remapping log, in accordance with some implementations. For example, when a number of object records stored in a RAM exceed a threshold, file management software 222 may perform method 500 to persist the object records from RAM to a page on a nonvolatile storage. It should be appreciated that method 500 may be implemented using an expandable index (e.g., index 400) that is divided into a plurality of buckets and comprises a plurality of pages that may be dynamically allocated to the buckets.

In implementations, method 500 may be implemented by hardware or a combination of hardware and programming, such as executable instructions stored on a machine readable medium and executed by a processor. In an example, method 500 may be implemented by one or more components of file management software 222, including indexing subsystem 300.

At operation 502, an indexing subsystem (e.g., indexing subsystem 300) may maintain a listing of a pool of unused pages of an index from the plurality of pages to which the plurality of object records may be written, and/or a listing of pages currently associated with buckets. For example, the listing of pages currently associated with buckets may identify what pages each bucket points to. In implementations, one or more logs (e.g., logs 430) may be used to maintain the listing of the pool of unused pages and/or the listing of pages currently associated with buckets. Additionally, the one or more logs may correlate a storage address on a storage drive to each page. In other implementations, other data structures may be used to maintain a listing of a pool of unused pages from the plurality of pages to which the plurality of object records may be written, and/or a listing of pages currently associated with buckets.

In some implementations, the listing of a pool of unused pages from the plurality of pages may be maintained in a separate data structure than the listing of pages currently associated with buckets. For example, the listing of pages currently associated with buckets may be persisted in a log whereas the pool of unused pages is not persisted in the log.

At operation 504, a page may be selected from the pool of unused pages to write one or more object records.

At operation 506, the selected page may be linked to a bucket of the index by updating the one or more logs to identify the selected page as a page that the bucket points to. In implementations where the selected page is used to update another page (e.g., a "second page") that was previously linked to the bucket, the one or more logs may be updated to reflect that the second page is no longer linked to the bucket. For example, a log entry identifying the second page as a page that the bucket points to may be overwritten to instead identify the newly selected page.

At operation 508, the one or more object records may be written to the selected page. For example, the one or more object records may be written to a storage address corresponding to a page on the disk. At operation 510, after the one or more object records are written to the selected page, the new mapping of the bucket to the selected page may be committed to persist the new mapping. In implementations where the selected page was used to update the second page, at optional operation 512 the second page may be added to the pool of unused pages (i.e., the listing of the pool of unused pages in the one or more logs may be updated).

Figure 6:
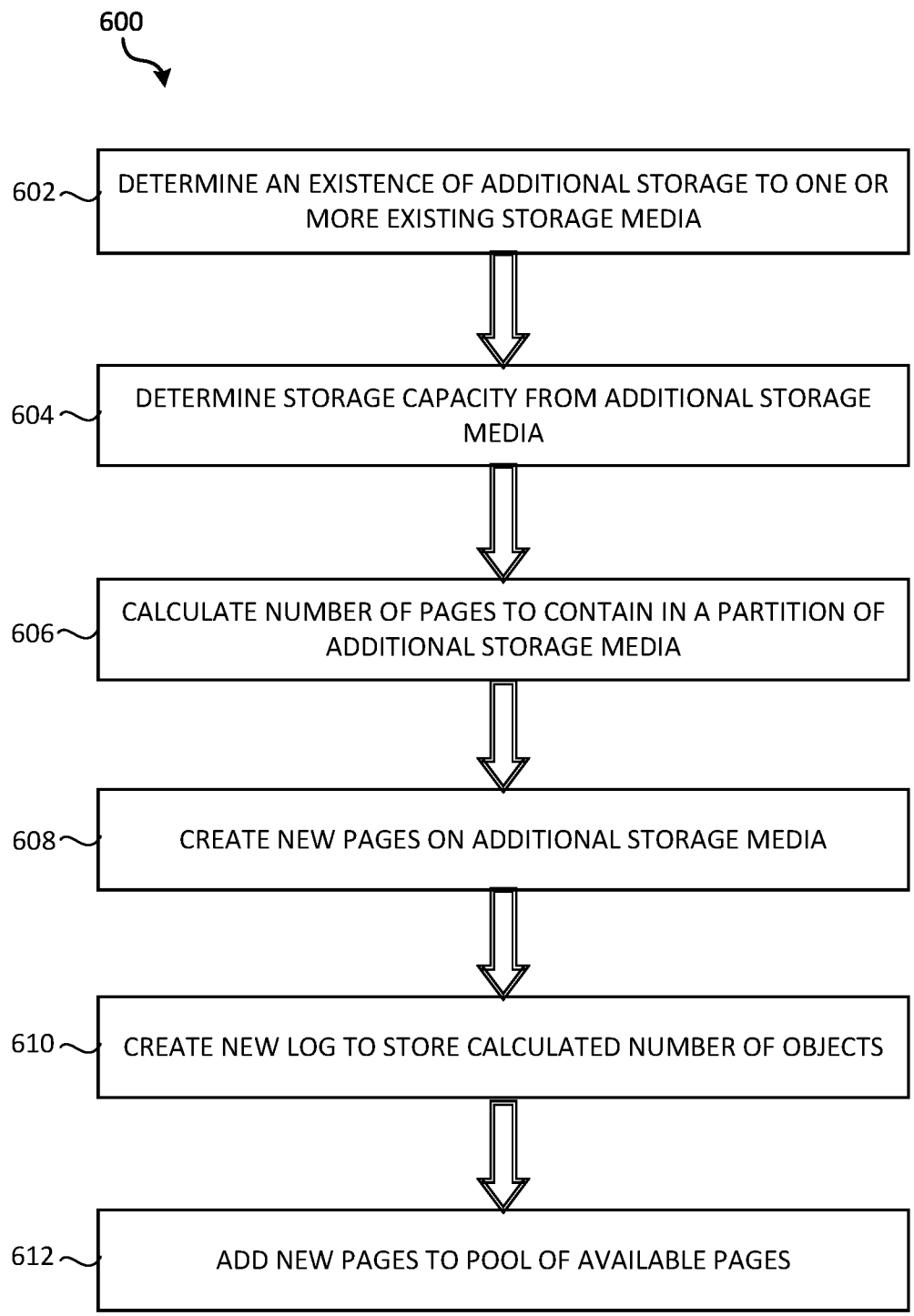
FIG. 6 is an operational flow diagram illustrating an example method to expand an expandable storage index by adding an additional storage media, in accordance with implementations.

FIG. 6 is an operational flow diagram illustrating an example method 600 to expand an expandable storage index (e.g., expandable index 400) by adding an additional storage media, in accordance with implementations. In implementations, method 600 may be implemented by hardware or a combination of hardware and programming, such as executable instructions stored on a machine readable medium and executed by a processor. In an example, method 600 may be implemented by one or more components of file management software 222, including indexing subsystem 300.

At operation 602, it may be determined that an additional storage media (e.g., a RAID storage having a number of hard disk drives (HDD) and/or solid state drives (SSD)) has been added to the one or more existing storage media of storage drives 201.

At operation 604, the storage capacity of the additional storage media may be determined.

At operation 606, the number of pages to contain in a partition of the storage media may be calculated. For example, file management software 222 may determine the number of objects that can be stored in the additional storage media by dividing the storage capacity of the storage media by the size of objects, and multiplying the quotient by a compression ratio. In particular implementations, the size of objects may vary between 1 KiB and 64 KiB. In implementations, the compression ratio may be user selectable. In particular implementations, the compression ratio may be between 1.5 and 2.5 In some implementations, the compression ratio and size of objects of the additional storage media may be different from the existing storage media of storage drives 201. The number of pages may be determined by dividing the determined number of objects by the number of object records that are stored per page.

At operation 610, the number of determined pages may be partitioned from the additional storage media. In some implementations, the number of pages determined at operation 608 are added to existing buckets of the existing storage media.

At operation 612, the available pages of the new index are added to the pool of available pages. In various implementations, the number of buckets in the expandable storage index of the existing storage media does not change with the addition of the new pages partitioned from the additional storage media. Rather, the size of the existing buckets may be increased by allocating additional pages from the pool of unused pages. By virtue of this, the storage index may be expanded without rehashing and redistributing object records in buckets of the index.

Figure 7:
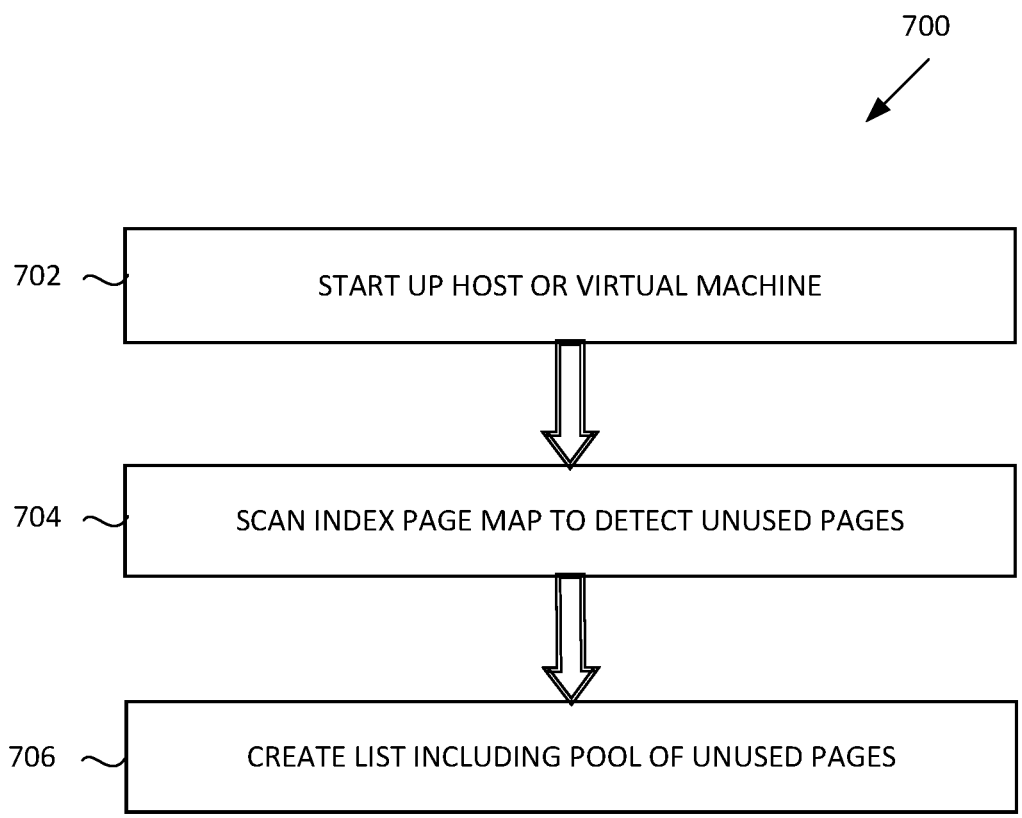
FIG. 7 is an operational flow diagram illustrating an example method of rebuilding a global mapping of an unused pool of pages of an index during startup, in accordance with implementations.

FIG. 7 is an operational flow diagram illustrating an example method of rebuilding a global mapping of an unused pool of pages of an index during startup, in accordance with implementations. In implementations, method 700 may be implemented by hardware or a combination of hardware and programming, such as executable instructions stored on a machine readable medium and executed by a processor. In an example, method 700 may be implemented by one or more components of file management software 222, including indexing subsystem 300.

At operation 702, a host 100 or virtual machine of the host 100 may start up. The started up host 100 may include one or more nonvolatile storages that store an index (e.g., index 400) including a plurality of pages. Additionally, the nonvolatile storage my store one or more logs (e.g., logs 430) maintaining a mapping between buckets and pages. At operation 704, an index page map (e.g., one or more logs 430) may be scanned to detect pages that are not currently mapped to buckets. At operation 706, the detected pages may be used to create a list or global mapping table including a pool of unused pages that may be assigned to any bucket of the index.

While implementations described herein have been primarily described in the context of using storage indices in hyperconverged or virtualized data storage systems, it should be appreciated that the technology described herein may be implemented in any of storage device or storage device array that utilizes an index that is divided into buckets.

Figure 8:
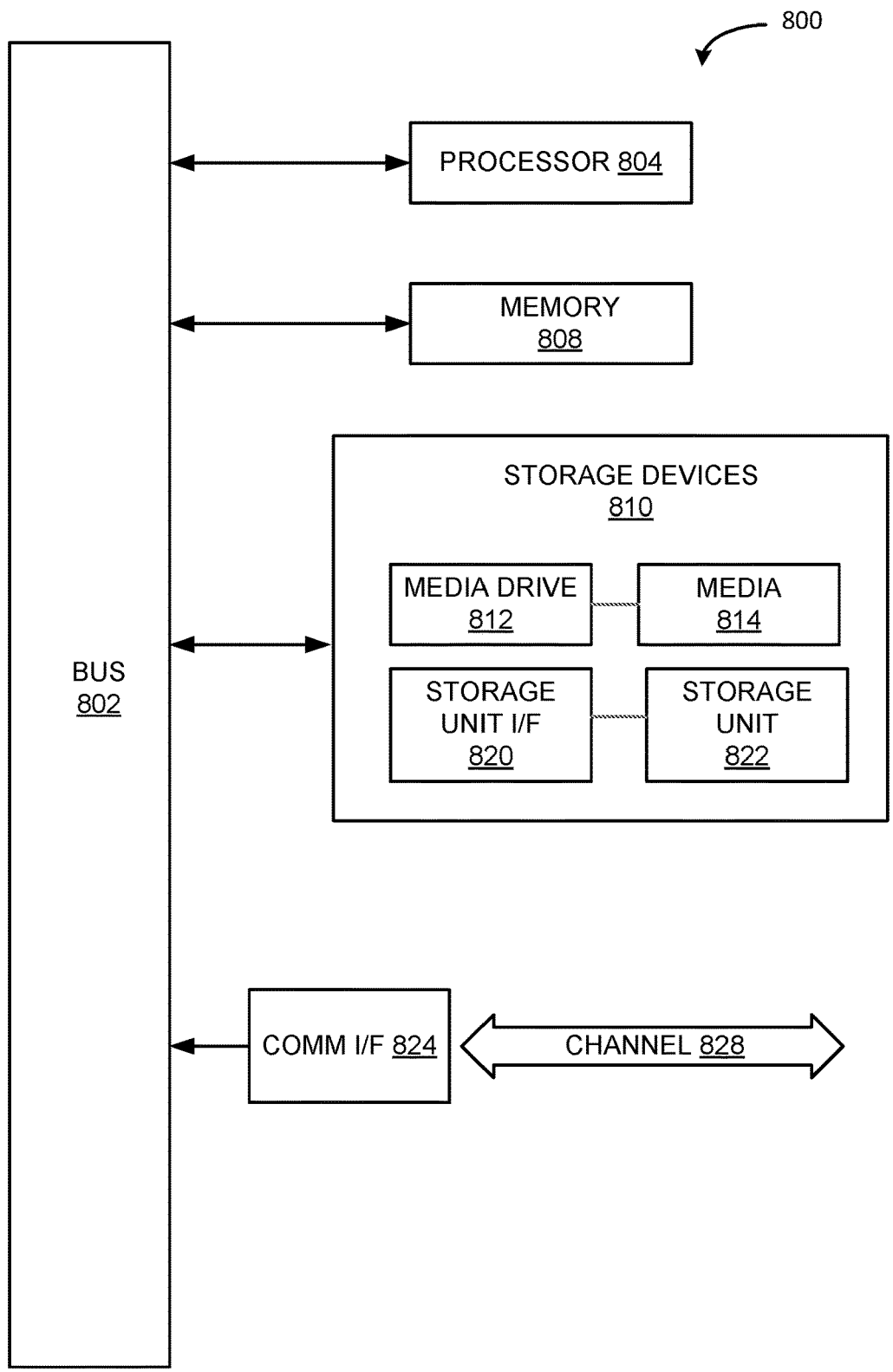
FIG. 8 is an example of a computing component that can be used in conjunction with various embodiments of the present disclosure.

FIG. 8 illustrates an example computing component 800 that may be used to implement various features of the methods disclosed herein. Computing component 800 may represent, for example, computing or processing capabilities found within desktops and laptops; hand-held computing devices (tablets, smartphones, etc.); mainframes, supercomputers, workstations or servers; or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, routers, gateways, modems, WAPs, terminals and other electronic devices that might include some form of processing capability.

Computing component 800 might include, for example, one or more processors, controllers, control components, or other processing devices, such as a processor 804. Processor 804 might be implemented using a general-purpose or special-purpose processing engine such as, for example, a microprocessor, controller, or other control logic. In the illustrated example, processor 804 is connected to a bus 802, although any communication medium can be used to facilitate interaction with other components of computing component 800 or to communicate externally.

Computing component 800 might also include one or more memory components, simply referred to herein as main memory 808. For example, preferably random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid state drive, an optical disk drive, a CD, DVD, or BLU-RAY drive (R or RW), or other removable or fixed media drive might be provided. Accordingly, storage media 814 might include, for example, a hard disk, a solid state drive, cartridge, optical disk, a CD, a DVD, a BLU-RAY, or other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot, a PCMCIA slot and card, and other fixed or removable storage units 822 and interfaces 820 that allow software and data to be transferred from the storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory mediums, volatile or non-volatile, such as, for example, memory 808, storage unit 822, and media 814. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A non-transitory computer-readable medium having executable instructions stored thereon that, when executed by a processor, cause the processor to perform operations of:
    maintaining an index comprising a plurality of pages to store a plurality of object records, wherein the index is divided into a plurality of buckets, wherein each of the plurality of buckets is associated with one or more of the plurality of pages;
    maintaining a log correlating a page on which stored object records are written to a location on a physical storage device;
    maintaining a listing of a pool of unused pages from the plurality of pages to which the plurality of object records may be written, wherein the pool of unused pages is shared across all of the buckets;
    receiving a data object to be stored in a storage drive;
    hashing the data object to generate a signature;
    determining if an object record stored in the index contains the signature;
    if an object record stored in the index contains the signature, performing inline deduplication of the data object; and
    if no object record stored in the index contains the signature, adding a new object record including the signature to an unused page from the pool of unused pages.

2. The non-transitory computer-readable medium of claim 1, wherein the instructions when executed by the processor, cause the processor to further perform an operation of:
    upon writing one or more of the plurality of object records to an unused page of the pool of unused pages, updating the log to reflect the writing of the one or more of the plurality of object records to the unused page and a corresponding location on the physical storage device.

3. The non-transitory computer-readable medium of claim 1, wherein the log further comprises a listing of pages currently associated with each of the buckets.

4. The non-transitory computer-readable medium of claim 3, wherein the instructions, when executed by the processor, further cause the processor to perform operations of:
    selecting one of the unused pages from the pool of unused pages to write an object record;
    linking the selected page to a bucket of the plurality of buckets by updating the log to associate the page with the bucket; and
    writing the object record to the selected page.

5. The non-transitory computer-readable medium of claim 4, wherein the instructions, when executed by the processor, further cause the processor to perform operations of:
    unlinking a second page from the bucket, wherein the selected page is used to update the second page; and
    adding the second page to the pool of unused pages.

6. The non-transitory computer-readable medium of claim 3, wherein the instructions, when executed by the processor, further cause the processor to perform operations of;
    starting up a host that stores the index in a nonvolatile storage;
    after starting up the host, scanning the log to detect pages that are presently unused by the plurality of buckets; and
    after scanning the log, creating the listing of the pool of unused pages.

7. The non-transitory computer-readable medium of claim 1, wherein the index is a hash index, wherein each of the buckets is configured to store object records having a hash signature within a corresponding range of hash signatures, wherein the hash signature identifies a data object associated with the object record.

8. The non-transitory computer-readable medium of claim 1, wherein the index is maintained by a virtual machine.

9. The non-transitory computer-readable medium of claim 8, wherein the virtual machine runs on a host in a cluster of hosts, wherein each of the hosts comprises one or more physical storage devices storing data objects corresponding to the plurality of object records.

10. The non-transitory computer-readable medium of claim 1, wherein the instructions when executed by the processor, further cause the processor to perform operations of:
    determining a number of object records to be written to an unused page from the pool of unused pages;
    comparing the number of object records to be written to the unused page to a threshold; and
    if the number of object records to be written to the available page exceeds the threshold, writing the one or more object records to the unused page.

11. The non-transitory computer-readable medium of claim 1, wherein the instructions when executed by the processor, cause the processor to further perform operations of:
   determining an existence of additional storage media added to the physical storage device;
   determining storage capacity of the additional storage media;
   calculating a number of pages to contain in a partition of the additional storage media based on at least a storage capacity of the additional storage media, an object size of the plurality of object records, and a number of object records that are stored per page;
   creating the partition of the additional storage media with new pages having a quantity that is the number of pages resulting from the calculating; and
   adding the new pages to the pool of unused pages.

12. The non-transitory computer-readable medium of claim 11, wherein the new pages are allocated among the plurality of buckets to expand the index.

13. The non-transitory computer-readable medium of claim 12, wherein a number of the plurality of buckets does not change when the new pages are allocated.

14. The non-transitory computer-readable medium of claim 12, wherein existing object records are not rehashed or redistributed in the index when the new pages are allocated.

15. A system, comprising:
   a processor; and
   a non-transitory computer-readable medium having executable instructions stored thereon that, when executed by the processor, cause the processor to perform operations of:
      maintaining an index comprising a plurality of pages to store a plurality of object records, wherein the index is divided into a plurality of buckets, wherein each of the plurality of buckets is associated with one or more of the plurality of pages;
      maintaining a log correlating a page on which stored object records are written to a location on a physical storage device;
      maintaining a listing of a pool of unused pages from the plurality of pages to which the plurality of object records may be written, wherein the pool of unused pages is shared across all of the buckets;
      receiving a data object to be stored in a storage drive;
      hashing the data object to generate a signature;
      determining if an object record stored in the index contains the signature;
      if an object record stored in the index contains the signature, performing inline deduplication of the data object; and
      if no object record stored in the index contains the signature, adding a new object record including the signature to an unused page from the pool of unused pages.

16. The system of claim 15, further comprising: a non-volatile storage storing the index.

17. The system of claim 15, wherein the log further comprises a listing of pages currently associated with each of the buckets.

18. The system of claim 17, wherein the instructions, when executed by the processor, further cause the processor to perform operations of:
   selecting one of the unused pages from the pool of unused pages to write an object record;
   linking the selected page to a bucket of the plurality of buckets by updating the log to associate the page with the bucket; and
   writing the object record to the selected page.

19. A method comprising:
   maintaining, by a processor, an index comprising a plurality of pages to store a plurality of object records, wherein the index is divided into a plurality of buckets, wherein each of the plurality of buckets is associated with one or more of the plurality of pages;
   maintaining, by the processor, a log correlating a page on which stored object records are written to a location on a physical storage device;
   maintaining, by the processor, a listing of a pool of unused pages from the plurality of pages to which the plurality of object records may be written, wherein the pool of unused pages is shared across all of the buckets;
   receiving a data object to be stored in a storage drive;
   hashing the data object to generate a signature;
   determining if an object record stored in the index contains the signature;
   if an object record stored in the index contains the signature, performing inline deduplication of the data object; and
   if no object record stored in the index contains the signature, adding, by the processor, a new object record including the signature to an unused page from the pool of unused pages.

20. The method of claim 19, further comprising:
   determining, by the processor, an existence of additional storage media added to the physical storage device;
   determining, by the processor, storage capacity of the additional storage media;
   calculating, by the processor, a number of pages to contain in a partition of the additional storage media based on at least a storage capacity of the additional storage media, an object size of the plurality of object records, and a number of object records that are stored per page;
   creating, by the processor, the partition of the additional storage media with new pages having a quantity that is the number of pages resulting from the calculating; and
   adding, by the processor, the new pages to the pool of unused pages.

* * * * *